United States Patent
Carter et al.

(10) Patent No.: US 7,477,169 B2
(45) Date of Patent: Jan. 13, 2009

(54) ROBUST CONTROL/DELINEATION IN SERIAL STREAMS

(75) Inventors: Collis Q. Carter, Richmond Hill (CA);
Nicholas J. Chorney, Toronto (CA);
James R. Goodman, Ottawa (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 11/678,825

(22) Filed: Feb. 26, 2007

(65) Prior Publication Data

US 2008/0204285 A1    Aug. 28, 2008

(51) Int. Cl.
    H03M 7/00    (2006.01)
(52) U.S. Cl. .......................... 341/59; 341/58
(58) Field of Classification Search ............ 341/50, 341/58, 59, 100, 101, 102; 714/701, 801, 714/715
    See application file for complete search history.

(56) References Cited

U.S. PATENT DOCUMENTS

| | | | | |
|---|---|---|---|---|
| 4,667,334 A * | 5/1987 | Collec et al. ............... | 375/368 |
| 4,745,605 A * | 5/1988 | Goldman et al. ........... | 714/801 |
| 5,625,644 A * | 4/1997 | Myers ........................ | 375/242 |
| 5,856,979 A   | 1/1999 | Vogel et al. | |
| 6,530,638 B2 * | 3/2003 | Shibata et al. ............. | 347/15 |
| 6,650,638 B1 * | 11/2003 | Walker et al. ............. | 370/389 |
| 6,862,701 B2 * | 3/2005 | Walker et al. ............. | 714/715 |
| 7,020,211 B2 * | 3/2006 | Terada et al. .............. | 375/259 |
| 7,055,073 B2 * | 5/2006 | Walker et al. ............. | 714/701 |
| 2005/0201339 A1 | 9/2005 | Mangin et al. | |

FOREIGN PATENT DOCUMENTS

| EP | 0 663 775 B1 | 4/2001 |
|---|---|---|
| WO | WO 2007/006128 A1 | 1/2007 |

OTHER PUBLICATIONS

Video Electronics Standards Association. VESA DisplayPort Standard Version 1.0. May 1, 2006.
American National Standards Institute, Inc, American National Standard for Information Technology-Fibre Channel- Physical and Signaling Interface (FC-PH), ANSI INCITS 230-1994 (R1999), pp. 63-71, New York: 1995.

* cited by examiner

*Primary Examiner*—Peguy JeanPierre
(74) *Attorney, Agent, or Firm*—Vedder Price P.C.

(57) ABSTRACT

Control symbols taking the form {k1-k2-k2-k1} are inserted in a serial stream including m bit data words. k1 and k2 are each predefined m bit control words differing from the m bit data words. The Hamming distance between k1 and k2 is at least 2. Such control symbols may be robustly detected in the presence of a one bit error in the symbol, or a data word immediately preceding or following the symbol. The m bit words may be 8B/10B encoded data, or defined control words. The control symbols may be used for data delineation, stream synchronization, transmitter/receiver synchronization or for other control signalling.

26 Claims, 9 Drawing Sheets

ROBUST CONTROL/DELINEATION IN SERIAL STREAMS

FIELD OF THE INVENTION

The present invention relates generally to serial streams, and more particularly to enhanced delineation and control symbols suitable for delineating data and synchronizing stream data.

BACKGROUND OF THE INVENTION

Digital processing and presentation of information is now in wide spread use in the consumer electronics and personal computing industries. Video, audio and text are now digitally manipulated and presented in a variety of applications.

In particular, digital display terminals are fast becoming commonplace—rapidly replacing older analog devices such as cathode ray tube monitors. Digital video transmission may take place between two integrated circuits in a given display device or between two external devices. Device-to-device digital video exchange may be observed between computers and monitors, set-top boxes and television displays, and projectors and display terminals.

To facilitate flexible transmission of digital video data between a transmitting device and a receiver, various standards defining suitable communications are evolving. The current trends use a serial link, to carry one or more data streams.

The DisplayPort standard, for example, provides a high bandwidth (currently 2.7 Gbps per stream), multi-stream forward transmission channel across a data link, with a bit error rate of no more than $10^{-9}$ per lane. Each serial stream is referred to as a lane. DisplayPort further provides for a bi-directional auxiliary channel and an interrupt request line from the receiver to the transmitting device, to facilitate link training and the exchange of control data.

Pixels in a digital video frame are sent in parallel using symbols across all lanes. The receiver must be able to identify frames, and to process symbols from different lanes that are transmitted together. As video is transmitted frame by frame, control symbols which carry synchronization information and control commands are required. The information carried by control symbols may include the start and end of vertical and horizontal blanking intervals, commands to reset a scrambler or reestablish a data link, and/or symbols used to synchronize a transmitter to a receiver.

Unfortunately, at such high transmission rates, errors may corrupt the stream and the control symbols which may cause a loss of synchronization between the receiver and transmitter.

The current mechanism for re-synchronizing requires the receiver to alert the transmitter of the loss of synchronization, using the auxiliary channel. However, this may entail an unacceptable delay leading to poor user experience.

Accordingly, there remains a need to for a more robust technique of exchanging control symbols that may be used for re-synchronizing, data delineation or other control.

SUMMARY OF THE INVENTION

Exemplary of the present invention, control symbols taking the form {k1-k2-k2-k1} or {k1-k1-k2-k2} are inserted in a serial stream including m bit data words. k1 and k2 are each predefined m bit control words differing from the m bit data words. The Hamming distance between k1 and k2 is at least 2. Such control symbols may be robustly detected in the presence of a one bit error in the symbol, or a data word immediately preceding or following the symbol. The control symbols may be used for data delineation, stream synchronization, transmitter/receiver synchronization or for other control signaling.

In accordance with an aspect of the present invention, there is provided, a method comprising: transmitting a serial stream from a transmitter to a receiver, in which m bit data words in the stream represent n bit data words wherein m>n, the; and including control symbols in the serial stream, wherein each of the control symbols takes the form {k1-k2-k2-k1}, and wherein k1 and k2 are each predefined m bit control words differing from the m bit data words, and wherein the Hamming distance between k1 and k2 is at least 2.

In accordance with another aspect of the present invention, there is provided, a transmitter for sending data to a receiver in a serial stream, the data arranged as m bit words in the serial stream, the transmitter comprising: an encoder for encoding n bit data words to be transmitted, as the m bit data words, wherein m>n; a controller in communication with the encoder to insert control symbols is the serial stream, the control symbols taking the form {k1-k2-k2-k1}, wherein k1 and k2 are each predefined m bit control words differing from the m bit data words, and wherein k1 and k2 are separated by a Hamming distance of at least 2.

In accordance with a further of the present invention, there is provided, a transmitter for sending data to a receiver in multiple serial streams, the data arranged as m bit words in each of the serial streams, the transmitter comprising: at least two lane encoders, each for encoding one of the serial streams, each lane encoder comprising an m/n encoder for encoding n bit data words to be transmitted as the m bit data words, wherein m>n; a controller in communication with the m/n encoders to insert control symbols in each of the serial streams, the control symbols taking the form {k1-k2-k2-k1}, wherein k1 and k2 are each predefined m bit control words differing from the m bit data words, and wherein k1 and k2 are separated by a Hamming distance of at least 2.

In accordance with another aspect of the present invention, there is provided, a receiver for receiving a serial bitstream comprising: a serial-to-parallel (S/P) converter for converting the serial bitstream to m bit words, wherein the m bit words comprise m bit data words and m bit control words; a decoder interconnecting the S/P converter, for decoding the m bit data words into n bit data words and for detecting m bit control words, wherein m>n; and a controller in communication with the decoder, for detecting control symbols of the form {k1-k2-k2-k1}, wherein k1 and k2 are each predefined m bit control words spaced by a Hamming distance of at least 2.

In accordance with yet another aspect of the present invention, there is provided a receiver for receiving data in multiple serial streams, the data arranged as m bit words in each of the serial streams, the receiver comprising: at least two lane decoders, each for decoding one of the serial streams, each lane decoder comprising: a serial to parallel converter (S/P), for converting one of the serial bitstreams to m bit words, wherein the m bit words comprise m bit data words and m bit control words; a decoder interconnecting the S/P converter, for decoding the m bit data words into n bit data words and for detecting m bit control words, wherein m>n; and a controller in communication with at least one of the decoders, for detecting control symbols of the form {k1-k2-k2-k1} in the serial streams, wherein k1 and k2 are each predefined m bit control words spaced by a Hamming distance of at least 2.

In accordance with a further aspect of the present invention, there is provided, a method of receiving a plurality serial streams from a transmitter, comprising: serial to parallel converting each of the serial streams, to form m bit control words and m bit data words; decoding each of the m bit data words as an n bit data word; detecting in each of the serial streams control symbols of the form {k1-k2-k2-k1}, wherein k1 and k2 are each predefined m bit control words differing from the m bit data words, and wherein the Hamming distance between k1 and k2 is at least 2.

In accordance with another aspect of the present invention, there is provided, a method comprising: transmitting a serial stream from a transmitter to a receiver, in which m bit data words in the stream represent n bit data words wherein m>n, the; including control symbols in the serial stream, wherein each of the control symbols takes the form {k1-k1-k2-k2}, and wherein k1 and k2 are each predefined m bit control words differing from the m bit data words, and wherein the Hamming distance between k1 and k2 is at least 2.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
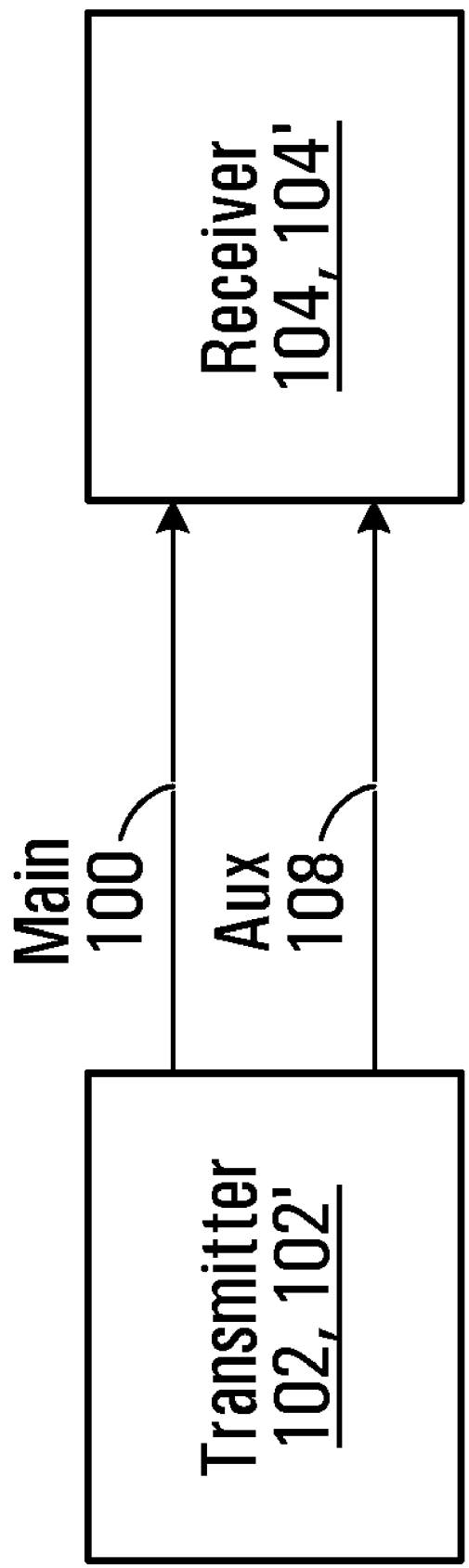
FIG. 1 is a block diagram of a digital transmitter and receiver interconnected by a channel carrying at least one serial stream, exemplary of embodiments of the present invention.

FIG. 1 is a schematic block diagram of a digital transmitter/receiver pair including a transmitter 102/102' and a receiver 104/104' interconnected by a serial link. A unidirectional primary link 100 provides serial data streams from transmitter 102/102' to receiver 104/104'. As will become apparent, transmitter 102/102' and receiver 104/104' may be suitable for the exchange of video and audio. As such transmitter 102/102' may form part of a digital video source, such as a personal video recorder, cable-television or terrestrial television receiver, DVD player, video game, computing device, or the like. Receiver 104/104' may form part of a display, such as a liquid crystal display (LCD), plasma, surface-conduction electron-emitter display (SED), or similar panel.

As illustrated, a main forward transmission channel 100 may be used to send data and a bi-directional auxiliary channel 108 may be used by both transmitter 102/102' and receiver 104/104' to communicate status and control data between them.

Figure 2:
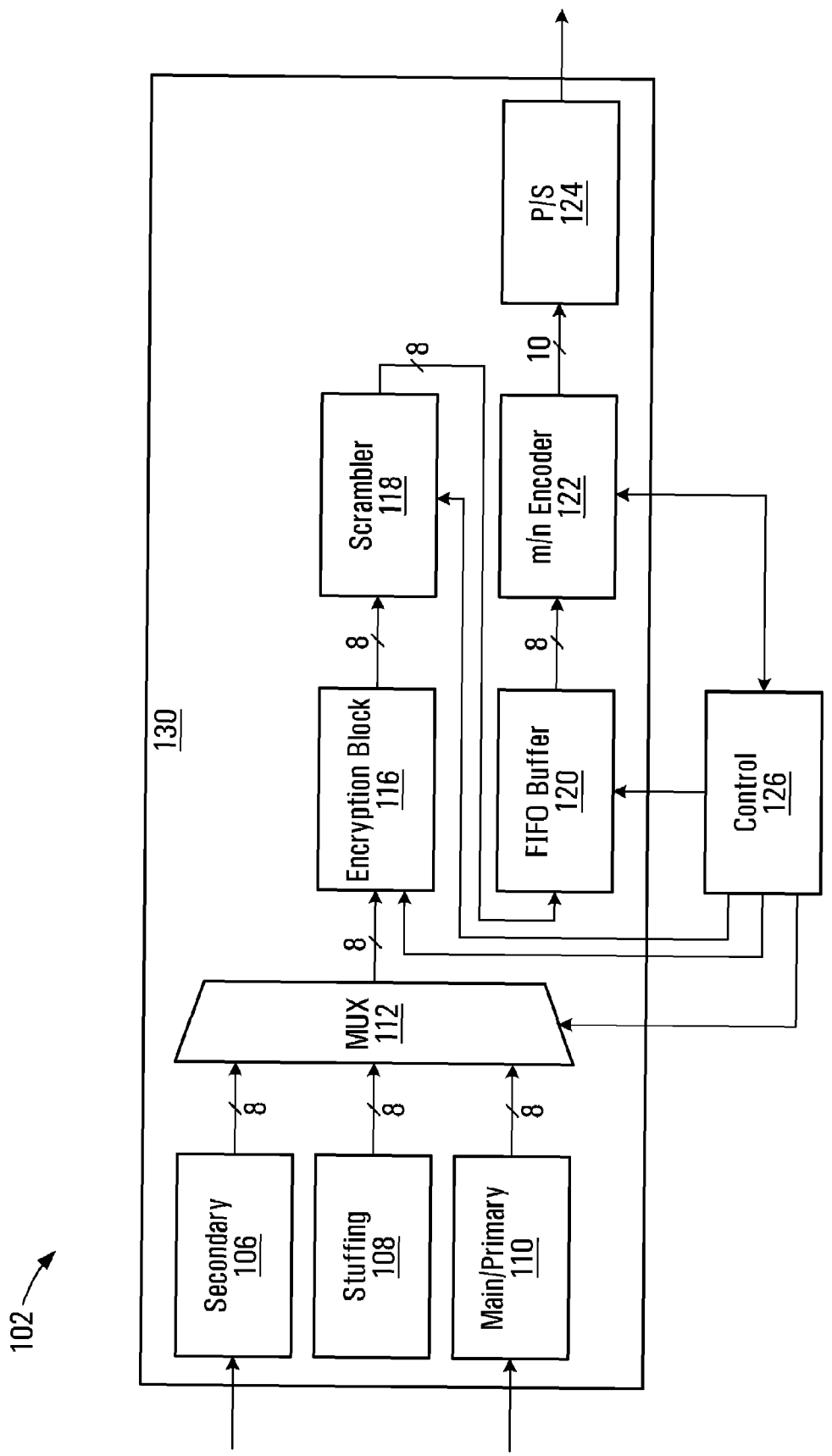
FIG. 2 is a simplified schematic diagram of a single lane transmitter useable in the transmitter/receiver of FIG. 1.

FIG. 2 is a schematic block diagram of transmitter 102 of FIG. 1. The depicted transmitter 102 transmits a single serial stream. As will be apparent, transmitter/receivers of FIG. 1 could easily be formed as multi-lane transmitters.

To this end, transmitter 102 includes a single serial channel encoder 130. Channel encoder 130 includes a multiplexer 112, receiving data from a plurality of sources: a primary channel data buffer 110; a secondary channel data buffer 106; and a stuff data source 108. Primary channel data buffer 110 is fed by a primary source of data to transmit—such as a source of a video pixel stream. Secondary channel data buffer 106 is similarly fed with a source of secondary data to transmit—such as a source of audio data, providing suitably encoded audio data.

Data from primary the primary data source and the secondary data source is provided n bit data words. In the depicted embodiment, n=8.

The output of multiplexer 112 is provided a stream of m bit words to an encryption block 116 where the data is encrypted for secure transmission across a possibly insecure channel. Encryption block 116 may be a public or private key encryption block that converts an unencrypted m bit words to corresponding m bit encrypted words, as understood by those of ordinary skill.

A scrambler 118 receives the output of encryption block 116 to deterministically scramble the data to ensure a certain statistical distribution of n bit data words at the output of scrambler 118. Scrambler 118, may, for example reduce electromagnetic interference caused by repeating patterns in the data stream. The output of scrambler 118 is fed to an optional first-in, first-out buffer (FIFO) 116 that may introduce a desired delay (or skew) in an output stream of data words, output by FIFO 120. The output of FIFO 120 is provided to an m/n bit encoder 122.

m/n bit encoder 122 generates an m bit data word for each n bit data word provided at its input (m is greater than n). Encoder 122 may for example be an ANSI 8B/10B encoder (i.e. n=8, m=10). The output 10 bit data words are chosen to ensure an approximate balance of 1s and 0s in bits output in the sequence of encoded m bit data words. To maintain the DC balance, each 8 bit data word may be encoded as two possible 10 bit data words, with one having more binary "1"s than "0"s, and the other having more binary "0"s than "1"s.

Control circuit 126 controls operation of serial stream encoder 130, and thus the overall format of the serial stream produced by encoder 130. Specifically, control circuit 126 controls which of buffer 106, 110 or stuff source 108 is selected at any instant in time. In particular, control circuit 126 ensures that primary and secondary channel data are time division multiplexed. In the absence of data for primary and secondary channels, stuff data is provided to multiplexer 110. Control circuit 126 may further control the insertion of control symbols in the produced stream, as described below, the cycle of encryption block 116, the cycle of scrambler 118, and the skew created by buffer 120.

m/n encoder 122 additionally outputs defined m bit control words, as the result of control signals provided to encoder 122, by control circuit 126. Specifically, in the presence of an asserted control signal, encoder 122 outputs reserved m bit words, that are not used to encode n bit data inputs, and may thus be easily distinguished from encoded data words. ANSI 8B/10B (as detailed ANSI INCITS 230-1994 (R1999): Information Technology—Fibre Channel—Physical and Signaling Interface (FC-PH) (formerly ANSI X3.230-1994

(R1999)), the contents of which are hereby incorporated by reference) defines numerous control words referred to as K-codes.

Example K-codes are set out in Table I, below:

TABLE I

| Input | ANSI 8B/10B code | |
|---|---|---|
| K.28.0 | 001111 0100 | 110000 1011 |
| K.28.1 | 001111 1001 | 110000 0110 |
| K.28.2 | 001111 0101 | 110000 1010 |
| K.28.3 | 001111 0011 | 110000 1100 |
| K.28.4 | 001111 0010 | 110000 1101 |
| K.28.5 | 001111 1010 | 110000 0101 |
| K.28.6 | 001111 0110 | 110000 1001 |
| K.28.7 | 001111 1000 | 110000 0111 |
| K.23.7 | 111010 1000 | 000101 0111 |
| K.27.7 | 110110 1000 | 001001 0111 |
| K.29.7 | 101110 1000 | 010001 0111 |
| K.30.7 | 011110 1000 | 100001 0111 |

As will be appreciated each of the above K-codes is represented by two separate binary codes: one may be used in the presence of a surplus of 0s in the stream; the other in the presence of a surplus of 1s in the stream.

Specifically, control signals provided by control circuit 126 at control inputs to encoder 122 may force the output of encoder 122 to produce defined 10 bit outputs, independent of data at the input of encoder 122.

A parallel to serial converter 124, converts the stream of m bit words to a serial binary stream. Conveniently, as the stream of 10 bit words provided to serial converter 124 is generally DC balanced, the resulting serial bit stream produced by parallel to serial converter 124 is also DC balanced.

Figure 4:
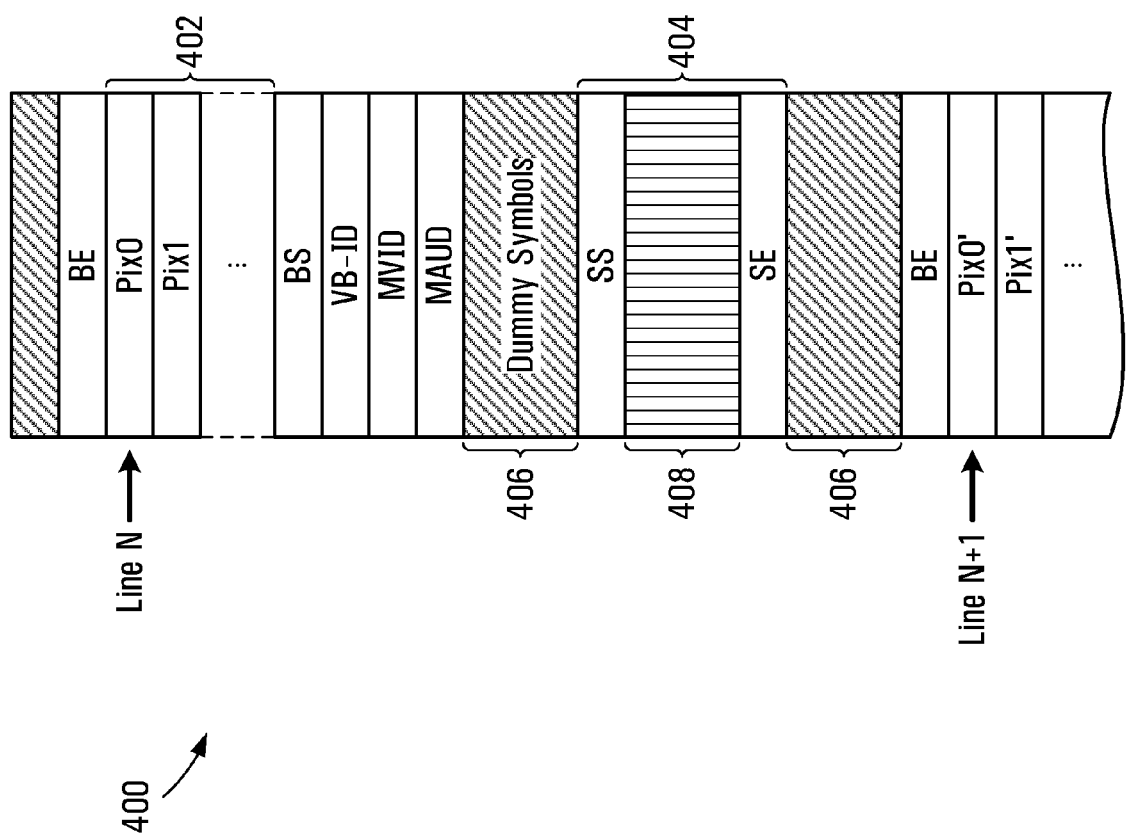
FIG. 4 is a block diagram illustrating the organization of data and control symbols in the stream transmitted between transmitter/receiver of FIGS. 2 and 3.

An example format of a produced stream is depicted in FIG. 4. As illustrated, the stream may include primary data 402 from buffer 110 and may optionally include secondary data 408 from buffer 106. Primary data 402 and secondary data 408 may be interspersed with stuffing data 406 originating with stuffing data source 108.

In the depicted embodiment, primary data 402 (and any accompanying stuff data) is organized in lines of words. Lines may correspond to lines of a digital video image. Lines are delimited by a blanking interval. In FIG. 4, data in line N is depicted. Secondary channel data 408 may be carried in the blanking interval. Primary data 402 is framed by control symbols BS (blanking start) and BE (blanking end). Secondary data 408 is framed by control symbols SS (secondary start) and SE (secondary end). Control symbols BE and BS define the beginning and end of the blanking interval, respectively. As will become apparent, symbols BE and/or BS may conveniently be used to delineate data within the serial stream output by transmitter 102, and to synchronize receiver 104 to transmitter 102. Exemplary of embodiments of the present invention, delineation symbols are chosen to allow for robust delineation of data within stream 400, in the presence of errors.

In order to ensure the ability for robust detection and delineation, BS is chosen as four m bit control words. For example BS may be chosen as a symbol represented as {k1-k2-k2-k1}. k1 and k2 are chosen to have a Hamming distance of at least two. As will be appreciated, choice of a Hamming distance of at least two prevents k1 from being corrupted into k2, and k2 into k1, in the presence of a one bit error. Conveniently, such choice of k1 and k2 allows for unambiguous and timely detection of control symbol BS in the presence of noise resulting in a single bit error in the data word preceding BS, in the BS symbol itself, or in the data word following BS.

By contrast, use of a single control word as a control symbol would not allow detection of the control symbol in the presence of a single bit error in the control symbol.

Similarly, forming a control symbol using repeated control symbols (e.g {k1-k1}), would not allow robust detection as a single bit error may obfuscate the position of the symbol in the stream. For example, corruption of the data word D immediately preceding the control symbol into control word k1 would result in ambiguity. That is, control symbol detection and data delineation/synchronization in the presence of { . . . D, k1, k1 k1, D, D . . . } or { . . . D, k1 k1, k1, D . . . } is not possible.

A two control words symbol using k1 and k2 (e.g. {k1-k2}) would similarly not reduce ambiguity. For example, corruption of a data symbol into control symbol k1 or k2 would result in false detection of the control symbol. Similarly, other control words formed of k1 and k2 would not be available for use.

Conveniently, use of control symbols formed as {k1-k2-k2-k1} with control symbols k1, k2 that have a Hamming distance of at least two, ensures that a single bit error in any of k1, k2, k2, or k1 in the control symbol may still be unambiguously detected.

An exemplary list of control symbols {k1-k2-k2-k1} meeting the requirement include ANSI 8B/10B control symbols {K28.5-K28.3-K28.3-K28.5}; {K28.0-K28.3-K28.3-K28.0}; {K28.5-K28.1-K28.1-K28.5}; and {K28.0-K28.1-K28.1-K28.0}.

Optionally, control circuit 126 may insert additional control symbols that may delineate other portions of the data stream, or be otherwise treated at a complementary receiver. For example, as noted secondary data 408 may be delimited with control symbols 404 SS (secondary start) and SE (secondary end); fill data 406 may be delimited with control symbols FS (fill start) and FE (fill end). Similarly, the data stream may include a symbol CPSR to reset the encryption sequence or SR to reset the scrambling sequence at receiver 104. Depending on whether or not these symbols should be robust, SS, SE, FS, FE, CPSR, and SR may be formed using one control word, or multiple control words.

Figure 3:
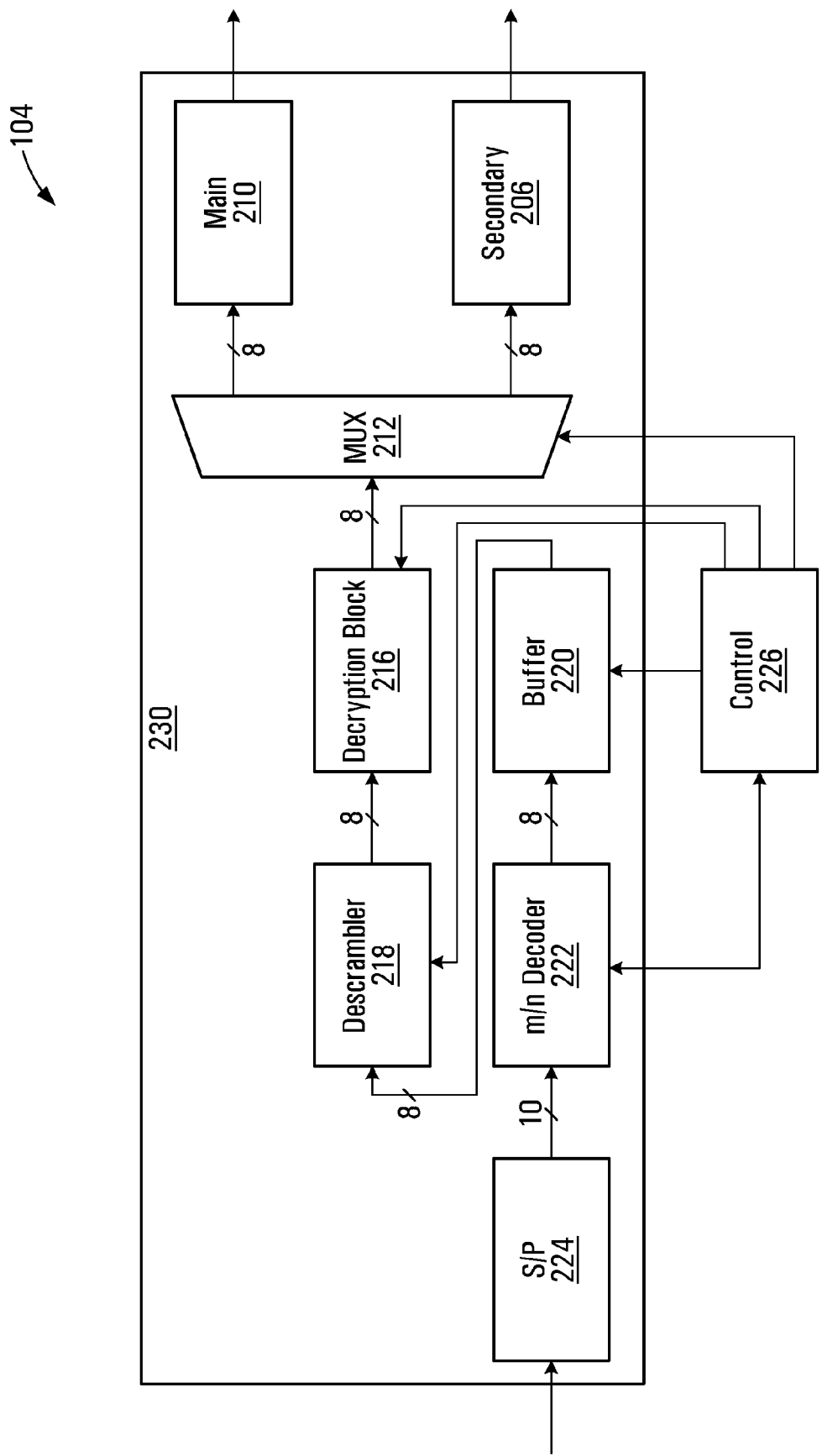
FIG. 3 is a block diagram of a complementary single lane receiver useable in the transmitter/receiver of FIG. 1.

FIG. 3 depicts schematic block diagram of receiver 104 of FIG. 1, complementary to transmitter 102. The depicted receiver 104 includes a single stream decoder 230. Single stream decoder 230 receives a single serial stream output by parallel to serial converter 124 of transmitter 102, passed over a serial channel from transmitter 100. As such, stream decoder 230 includes a serial to parallel (S/P) converter 224 that converts the received serial bit stream into a stream of m bit words. A control circuit 226 controls overall operation of receiver 104.

An n/m decoder 222 generates an n bit data word for each m bit data word provided at its input by S/P converter 224. n/m decoder 222 is complementary to encoder 122 of transmitter 102. As such, n/m decoder 222 may for example be an ANSI 8B/10B decoder.

n/m decoder 222 further signals receipt of any m bit control words to control circuit 226. Control circuit 226 may use m-bit control words to detect control symbols to delineate the received data, or otherwise to control the operation of receiver 104.

n bit decoded data words 222 are provided to FIFO buffer 220 that feeds a descrambler 218 that descrambles scrambled data. Descrambler 218 is complementary to scrambler 118, and undoes any scrambling performed by scrambler 118.

FIFO 220 under control of control circuit 226 may be used to realign skewed data streams when multiple lanes are used, as will be described below.

The output of descrambler 218 is provided to a decryption block to decrypt the received stream and provided to a de-multiplexer 212 in communication with control circuit 226. Decryption block 216 is complementary to encryption block 116 of transmitter 102 and generates decryption sequence that may be used to decrypt n bit data words previously encrypted by encryption block 116. Decryption block 116 may be controlled by control circuit 216, that may re-set or resynchronize the decryption sequence produced by decryption block 116.

De-multiplexer 212 receives the decrypted output and may de-multiplex its input data into a primary/main stream and secondary stream. Control circuit 226 may control the operation of de-multiplexer 212. For example, data delineated by a BE and/or a BS symbol may be de-multiplexed as pixel data, and output to a main data buffer 210. Similarly, data delineated by SS and SE symbols may be de-multiplexed as secondary stream data, output to a secondary data buffer 206. Likewise, data delineated by symbols FS and FE may be de-multiplexed as fill data.

Figure 5:
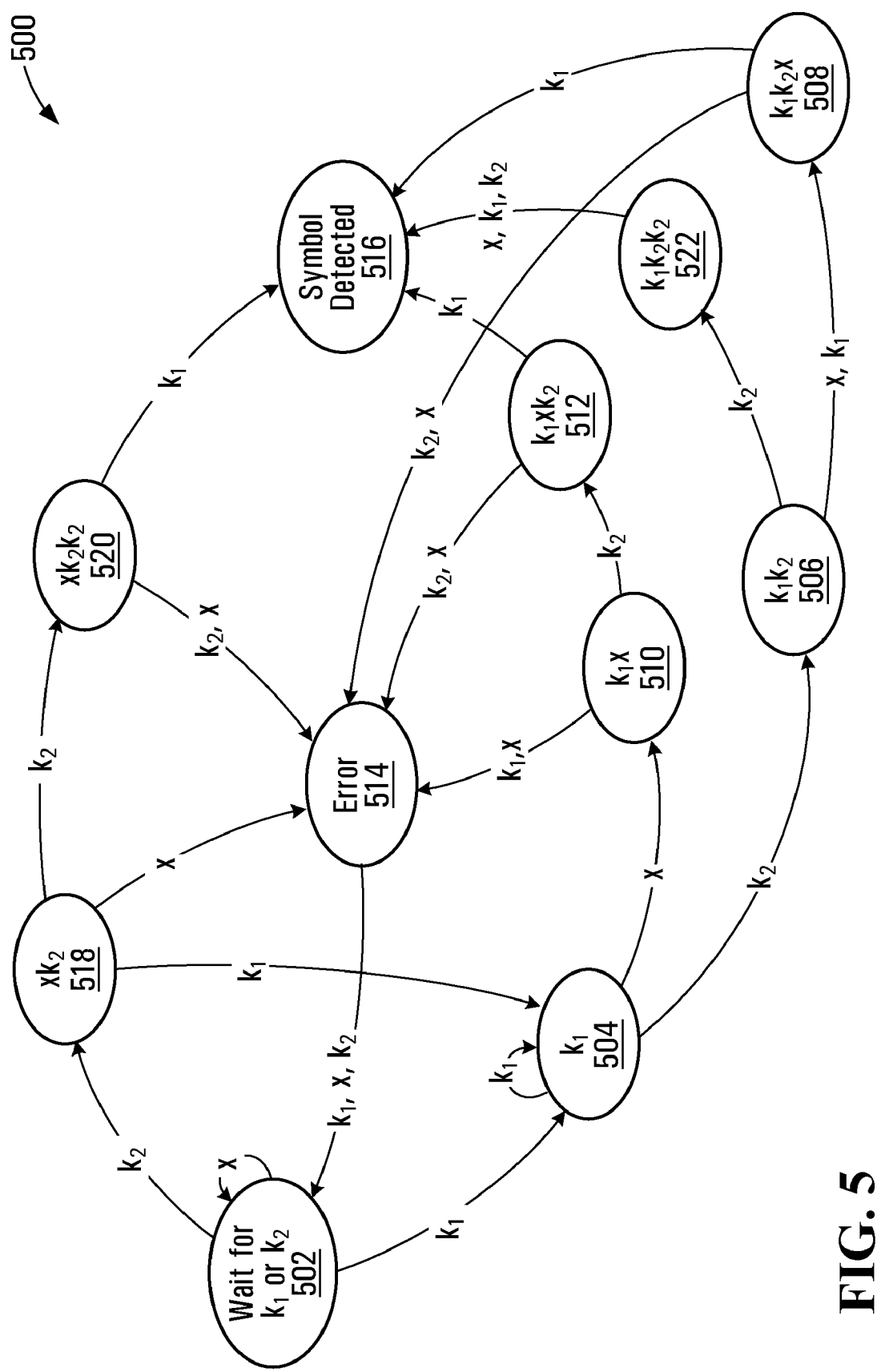
FIG. 5 is a state diagram illustrating detection of control symbols by the receiver of FIG. 3.
Figure 6:
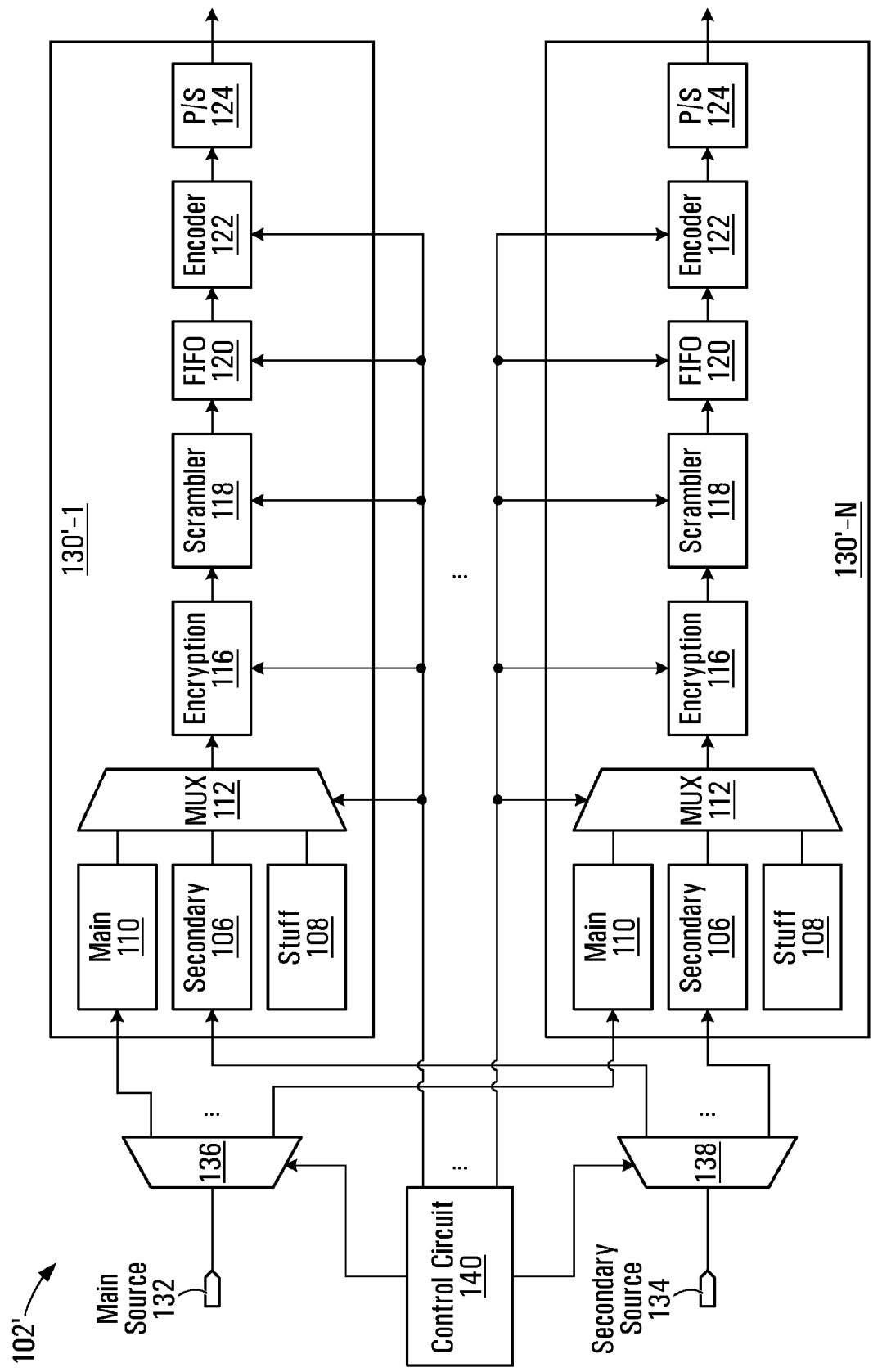
FIG. 6 is a simplified schematic diagram of a multi-lane transmitter useable in the transmitter/receiver of FIG. 1.

Conveniently, any control symbol that is robustly encoded using the described four control word encoding may be detected by control circuit 216 as illustrated in FIG. 5. Specifically, control circuit 216 maintains a state machine 500 to detect the control symbol {k1-k2-k2-k1} or any one bit variation thereof. Thus, state machine 500 is initially in its wait state 502. Upon being signaled of the arrival of a control word k1, or k2 by n/m decoder 222, state machine 500 enters state 504 or state 518. Thereafter, the next three arriving data or control words control state transitions of state machine 500. So, if after receipt of k1, a data or control word other than k2 (collectively denoted as symbol x) arrives in the incoming stream, state machine 500 assumes state 510, and waits for subsequent control words k2 (state 512) and thereafter k1 in order to detect {k1-x-k2-k1} and interpret it as control symbol {k1-k2-k2-k1} in state 516. Similarly, if after receipt of k1, words k2, x' (a data or control word other than k2), k1 are received, {k1-k2-x'-k1} is detected and interpreted as {k1-k2-k2-k1} in state 516, via state 508. Likewise, {k1-k2-k2-k1} is detected via state 522. A symbol non-detect state (or error state) 514 is entered in response to detecting the word sequence {k1-x-x} or {k1-x-k2-x}.

Similarly, upon receipt of symbol k2, the word sequence {x-k2-k2-k1} is detected, and interpreted as control symbol {k1-k2-k2-k1} in state 516, via states 518 and 520.

Conveniently, as soon as state 516 is assumed, the control or delineation symbol {k1-k2-k2-k1} has been detected, and a timing signal may be generated by control circuit 216. This timing signal may be used to delimit data in the received stream, or synchronize to receiver 104 to transmitter 102.

For each control symbol of the form {k1-k2-k2-k1} to be recognized by receiver 102, receiver 102 may include an additional state machine having the form of state machine 500. Again, each state machine may generate a timing signal upon detection of its four control word control symbol.

In the presence of a loss of synchronization between transmitter 102 and receiver 104, caused for example by a high bit error rate, receiver 104 may alternatively signal for resynchronization or retransmission of transmitted streams, by way of auxiliary channel 108 (FIG. 1).

As will be appreciated, at a bit error rate of $10^{-9}$, frequent single bit errors may occur. For example, at a data rate of 1.62 Gbps, a single bit error leads to an error being detected at the receiver every 0.62 seconds. At data rate of 2.70 Gbps, a single bit error leads to an error being detected at the receiver every 0.37 seconds. Advantageously, in the presence of robust delineation/control symbols such single bit errors may be tolerable, and need not result in a loss of synchronization or other error.

Optionally, upon receipt of other control symbols like SR, and CPSR, control circuit 216 may reset the cycle generated by descrambler 218, or decryption block 216, allowing accurate synchronization of these blocks with their transmitter counterparts (i.e. scrambler 118, encryption block 116) at transmitter 102. As will be appreciated, state machine 500 may be replicated for each control symbol to be detected.

Figure 7:
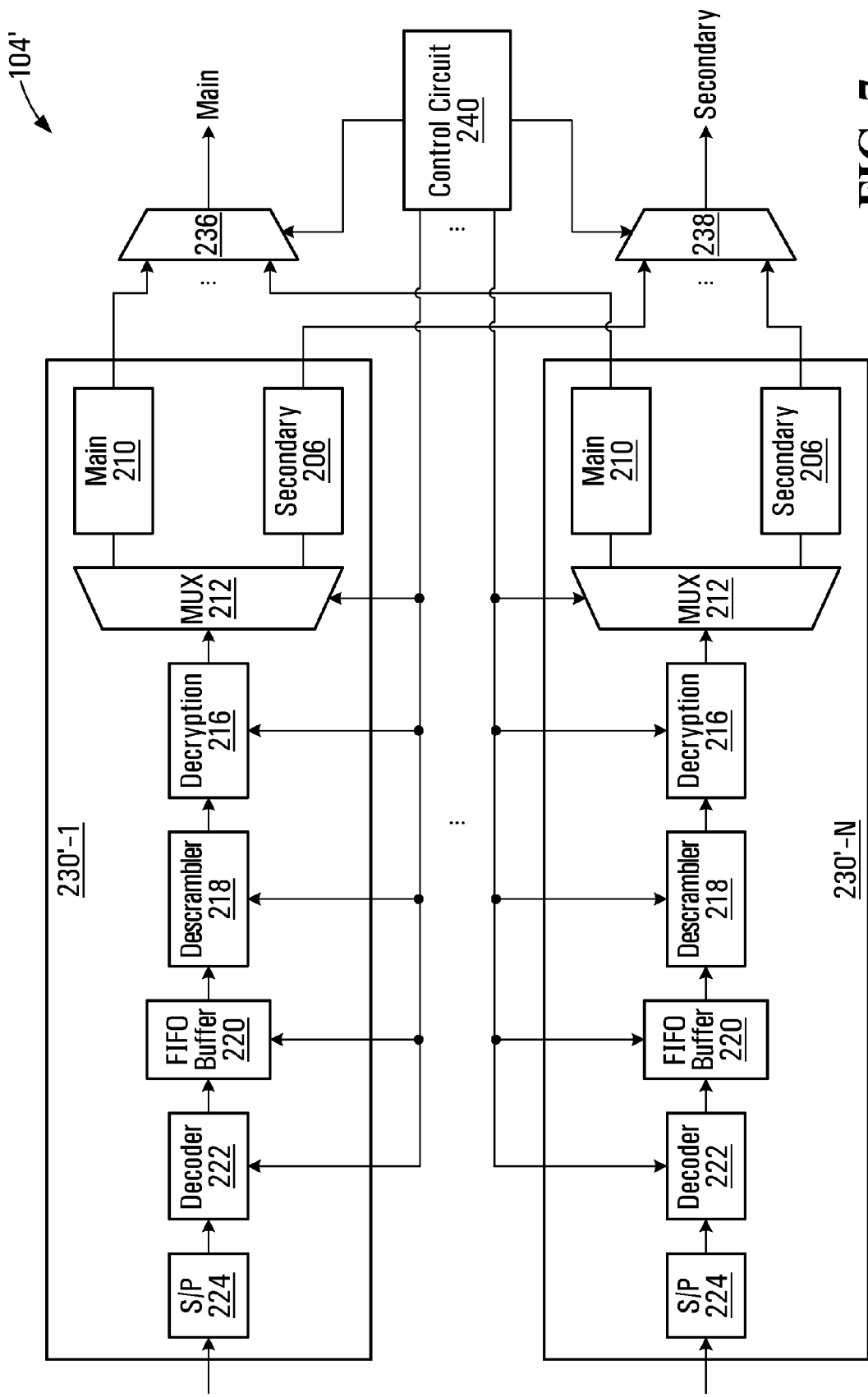
FIG. 7 is a block diagram of a complementary multi-lane receiver useable in the transmitter/receiver of FIG. 1.
Figure 8:
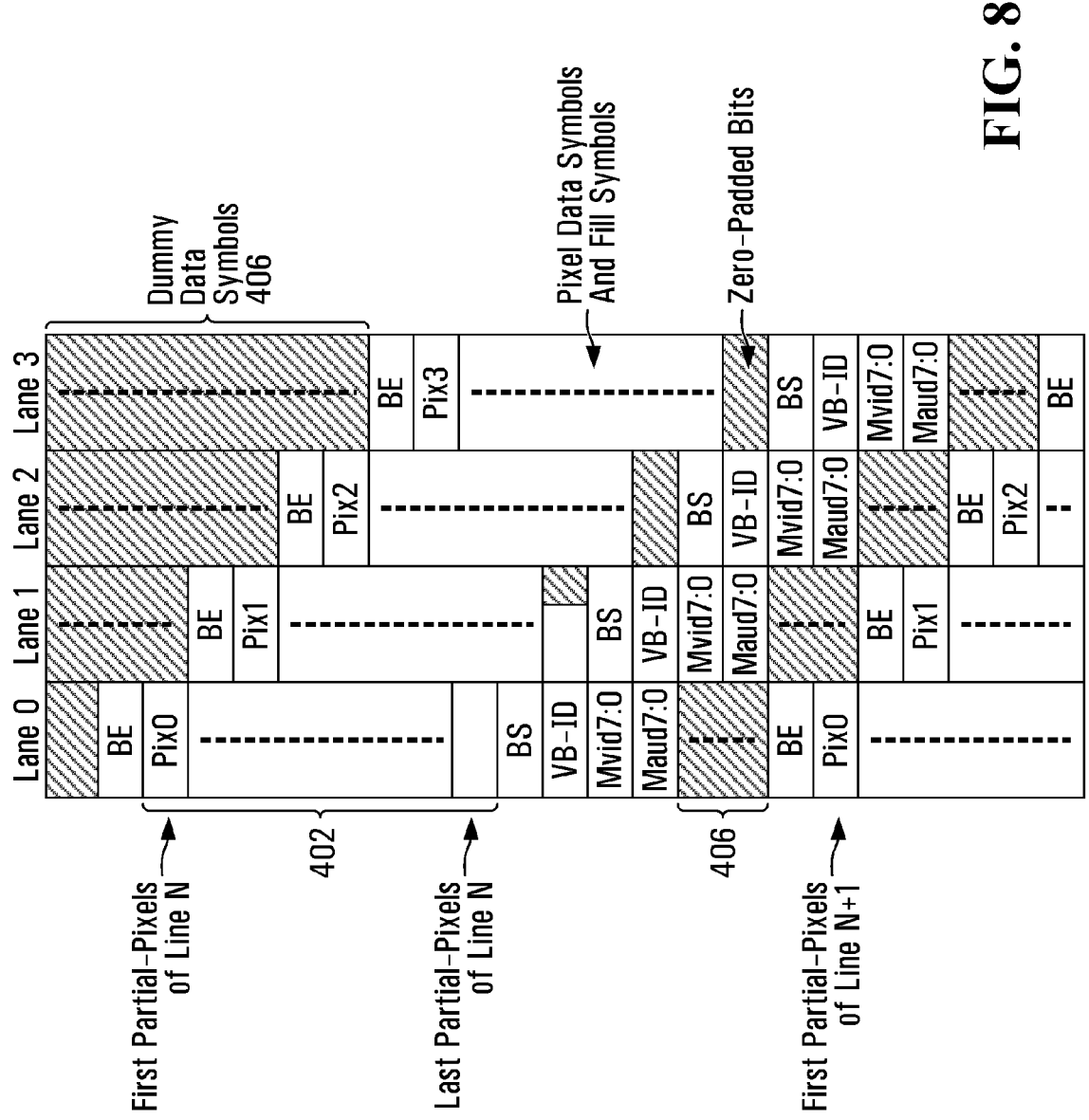
FIG. 8 is a block diagram illustrating the organization of data and control symbols in multiple lanes transmitted between transmitter/receiver of FIGS. 6 and 7.

A further exemplary transmitter/receiver pair 102'/104' is illustrated in FIGS. 7 and 8. As illustrated, an example transmitter 102' may be formed of a plurality single lane encoders 130'-1, 130'-2 . . . 130'-n (individually and collectively lane encoders 130'), formed like single lane encoder 130 of transmitter 102 of FIG. 2. Further de-multiplexers 136, 138 under control of a control circuit 140, may de-multiplex primary and secondary data from a primary and secondary data source among the multiple single lane encoders 130'. In this way, payload data from primary source and secondary source may be multiplexed across several serial streams (or lanes). Each stream may be carried on a separated cable or wires.

Resulting payload data is illustrated in FIG. 8. As illustrated, payload data across multiple lanes may be skewed, using FIFO buffers 120, of each lane encoder 130'. In the depicted embodiment, each lane encoder 130', is formed in a manner identical to lane encoder 130 of transmitter 102. However, a single controller 140 controls overall operation of the multiple lane encoders, and of multiplexers 136, and 138. Controller 140 ensures that each of the multiple lanes includes control symbols, as describer with reference to the stream of FIG. 4. Controller 140 also controls inter-lane skew by controlling the effective word size of each FIFO 130.

Again, control symbols in each of the multiple lanes such as symbol BS may be formed using four control words {k1-k2-k2-k1}, as described above. Inter-lane skewing may increase the immunity of the link against external noise.

A complementary multi-lane receiver is schematically depicted in FIG. 7. As illustrated, multi-lane transmitter includes multiple serial lane decoders 230'-1, 230'-2 . . . 230'-n (individually and collectively lane decoders 230'), each identical to serial lane decoder 230 of receiver 104 of FIG. 3.

Figure 9:
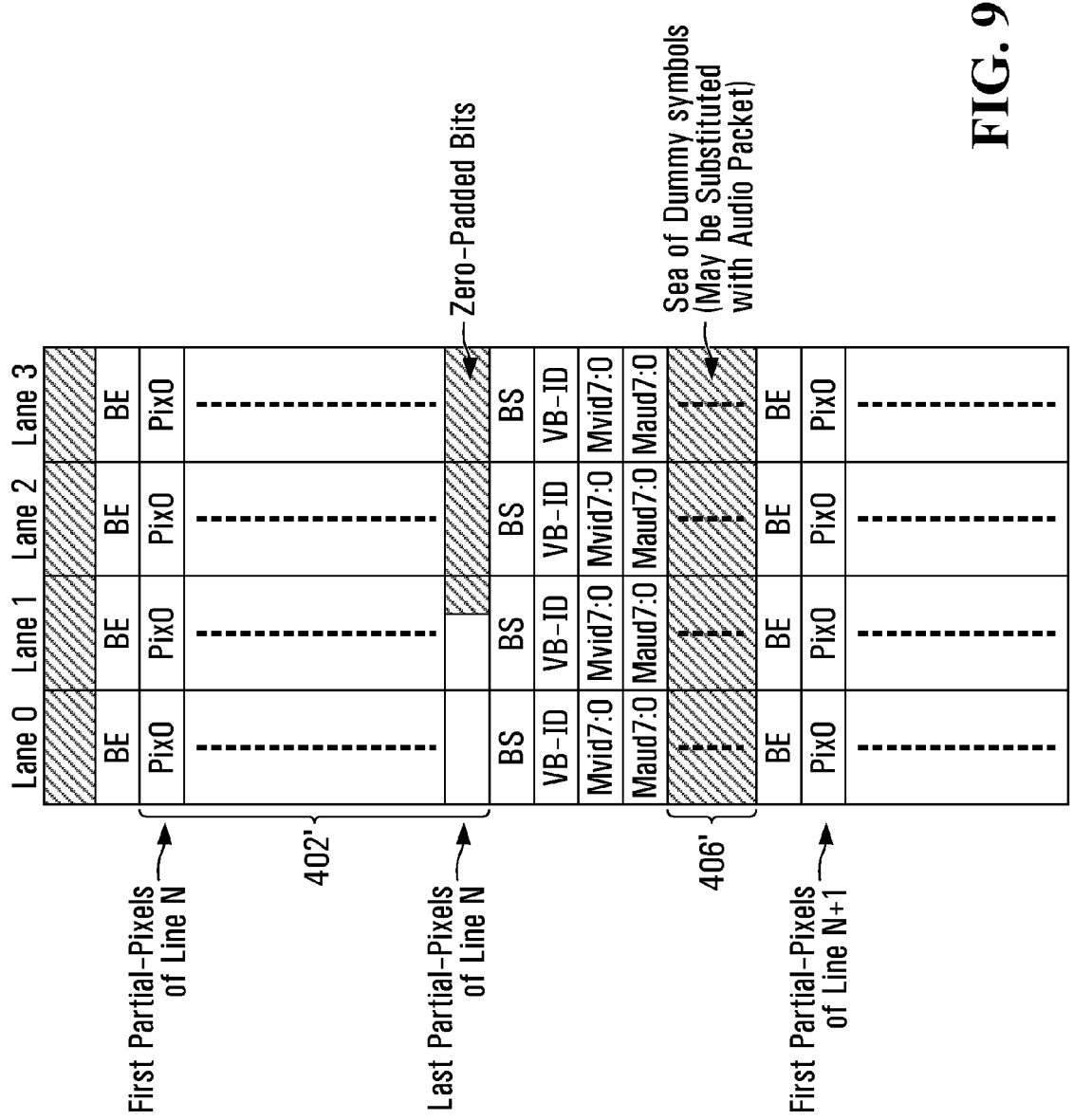
FIG. 9 is a block diagram illustrating the organization of data and control symbols in aligned streams at the receiver of FIG. 7.

Control signals from each n/m bit decoder 222 of each lane decoder 230 are provided to control circuit 240. Control circuit 240 may include state machines like state machine 500 (FIG. 5) for each lane, and optionally for each other control symbol (including four word control symbols) to be detected. Detection of control symbol BS={k1-k2-k2-k1} in each lane, may be used by control circuit 240, to control delays introduced by FIFO buffers 220 of each lane. Specifically, FIFO buffers 220 the size of each FIFO buffer may be adjusted to ensure BS symbols within each lane align, as illustrated in FIG. 9. Data in the multiple streams are consequently aligned. Conveniently, detection of BS symbols, once aligned may also be used to control de-multiplexers 212 of each lane decoder 230, so that main data and secondary data may be de-multiplexed and presented to buffers 210 and 206 of each lane decoder 230. Main and secondary data from multiple lane decoders 230 may be further be multiplexed by multiplexers 236 and 238, to generate main and secondary data streams, all under control of control circuit 240.

As may now be appreciated, control symbols of the form {k1-k2-k2-k1} are not the only symbols suitable for use in receiver/transmitter pair 102/104 or 102'/104'. Instead, control symbols of the form {k1-k1-k2-k2} could be used. State machine 500 may be suitably adapted.

Of course, the above described embodiments are intended to be illustrative only, and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method comprising:
    transmitting a serial stream from a transmitter to a receiver, said serial stream comprising m bit data words and m bit control words in which said m bit data words each represent n bits of data, wherein m>n,;
    including control symbols in said serial stream, wherein each of said control symbols comprises four of said m bit control words and takes the form k1-k2-k2-k1 wherein k1 and k2 are each predefined ones of said m bit control words that differ from every one of said m bit data words, and wherein the Hamming distance between k1 and k2 is at least 2.

2. The method of claim 1, wherein said control symbols are delineation symbols at defined locations in said stream relative to said m bit data words.

3. The method of claim 2, wherein said delineation symbol delineates the beginning of a line of said n bit data words in said serial stream.

4. The method of claim 2, further comprising a second serial stream from said transmitter to said receiver, said second serial stream comprising delineation symbols at defined locations relative to data words in said second stream, and wherein each of said delineation symbols takes the form k1-k2-k2-k1.

5. The method of claim 4, wherein said delineation symbols in said serial stream and said second serial stream, synchronize said serial stream with said second serial stream.

6. The method of claim 1, wherein said control symbols are used to synchronize said receiver to said transmitter.

7. The method of claim 6, wherein said encoding comprises 8B/10B encoding.

8. The method of claim 1, wherein m=10 and n=8.

9. The method of claim 1, wherein said encoding maintains an approximate DC balance in said stream.

10. The method of claim 1, wherein each of k1 or k2 is chosen as an m bit control word or its two's complement.

11. The method of claim 1, wherein k1 and k2 are chosen from the group of 8B/10B control words consisting of K28.0, K28.1, K28.3 and K28.5.

12. The method of claim 1, wherein k2=K28.5, and k1=K28.3, ANSI 8B/10 control words.

13. A transmitter for sending data to a receiver in a serial stream, said data arranged as m bit words in said serial stream, said transmitter comprising:
    an encoder for encoding each n bits of data to be transmitted, as an m bit data word, wherein m>n;
    a controller in communication with said encoder to insert control symbols in said serial stream, each of said control symbols comprising four m bit control words and wherein said control symbols take the form k1-k2-k2-k1, wherein k1 and k2 are each predefined m bit control words differing from each one of said m bit data words, and wherein k1 and k2 are separated by a Hamming distance of at least 2.

14. The transmitter of claim 13, wherein said controller inserts said control symbol at defined locations in said stream relative to said m bit data words.

15. The transmitter of claim 14, wherein m=10 and n=8.

16. The transmitter of claim 13, wherein said encoder maintains an approximate DC balance in said stream.

17. The transmitter of claim 16, wherein said encoder comprises an 8B/10B encoder.

18. A transmitter for sending data to a receiver in multiple serial streams, said data arranged as m bit words in each of said serial streams, said transmitter comprising:
    at least two lane encoders, each for encoding one of said serial streams, each lane encoder comprising
        an m/n encoder for encoding n bits of data to be transmitted as said one of said m bit data words, wherein m>n;
    a controller in communication with said m/n encoders to insert control symbols in each of said serial streams, said control symbols comprising four of said m bit control words, and taking the form k1-k2-k2-k1, wherein k1 and k2 are each predefined m bit control words differing from said m bit data words, and wherein k1 and k2 are separated by a Hamming distance of at least 2.

19. A receiver for receiving a serial bitstream comprising:
    a serial-to-parallel (S/P) converter for converting said serial bitstream to m bit words, wherein said m bit words comprise m bit data words and m bit control words;
    a decoder interconnecting said S/P converter, for decoding said m bit data words into n bit data words and for detecting m bit control words, wherein m>n; and
    a controller in communication with said decoder, for detecting control symbols comprising four of said m bit control words, and having the form k1-k2-k2-k1, wherein k1 and k2 are each predefined m bit control words spaced by a Hamming distance of at least 2.

20. The receiver of claim 19, wherein said controller synchronizes said receiver to a complementary transmitter upon detection of one of said control symbols.

21. A receiver for receiving data in multiple serial streams, said data arranged as m bit words in each of said serial streams, said receiver comprising:
    at least two lane decoders, each for decoding one of said serial streams, each lane decoder comprising:
        a serial to parallel converter (S/P), for converting one of said serial bitstreams to m bit words, wherein said m bit words comprise m bit data words and m bit control words;
        a decoder interconnecting said S/P converter, for decoding each of said m bit data words into n bits of data and for detecting m bit control words, wherein m>n; and
    a controller in communication with at least one of said decoders, for detecting control symbols comprising four of said m bit control words of the form k1-k2-k2-k1 in said serial streams, wherein k1 and k2 are each predefined m bit control words spaced by a Hamming distance of at least 2.

22. The receiver of claim 21, wherein each of said lane decoders comprises a first-in, first out (FIFO) buffer for introducing a controllable delay into each of said streams.

23. The receiver of claim 22, wherein said controller controls said FIFO buffers to deskew data in said multiple serial streams, based on said control symbols in said multiple streams.

24. A method of receiving a plurality serial streams from a transmitter, comprising:
    serial to parallel converting each of said serial streams, to form m bit control words and m bit data words;
    decoding each of said m bit data words as an n bits of data;
    detecting in each of said serial streams control symbols comprising four of said m bit control words of the form k1-k2-k2-k1, wherein k1 and k2 are each predefined m bit control words differing from said m bit data words, and wherein the Hamming distance between k1 and k2 is at least 2.

25. The method of claim 24, further comprising:
delineating and aligning data in said plurality of serial streams using said control symbols.

26. A method comprising:
transmitting a serial stream from a transmitter to a receiver, said serial stream comprising m bit data words and m bit control words in which said m bit data words each represent n bits of data, wherein m>n,;
including control symbols in said serial stream, wherein each of said control symbols comprises four of said m bit control words and takes the form k1-k1-k2-k2 wherein k1 and k2 are each predefined ones of said m bit control words that differ from every one of said m bit data words, and wherein the Hamming distance between k1 and k2 is at least 2.

* * * * *